United States Patent
Roth-Stielow et al.

(10) Patent No.: US 6,483,217 B1
(45) Date of Patent: Nov. 19, 2002

(54) ELECTROMAGNETIC OPERABLE MECHANICAL BRAKE FOR AN ELECTRIC MOTOR

(75) Inventors: Jörg Roth-Stielow, Bretten (DE); Josef Schmidt, Graben-Neudorf (DE)

(73) Assignee: Sew Eurodrive GmbH & Co., Bruchsal (DE)

( * ) Notice: Subject to any disclaimer, the term of this patent is extended or adjusted under 35 U.S.C. 154(b) by 0 days.

(21) Appl. No.: 09/486,457

(22) PCT Filed: Aug. 25, 1998

(86) PCT No.: PCT/EP98/05394

§ 371 (c)(1),
(2), (4) Date: May 16, 2000

(87) PCT Pub. No.: WO99/10967

PCT Pub. Date: Mar. 4, 1999

(30) Foreign Application Priority Data

Aug. 25, 1997 (DE) .......................... 197 36 942
Oct. 17, 1997 (DE) .......................... 197 46 027

(51) Int. Cl.$^7$ ............................................... H02K 49/00
(52) U.S. Cl. ........................... 310/93; 310/77; 188/161
(58) Field of Search ............................. 310/93, 94, 77, 310/75 R, 71, 68 R; 188/171, 161, 72.1, 72.3; 335/256; 187/286; 439/426

(56) References Cited

U.S. PATENT DOCUMENTS

| | | | | |
|---|---|---|---|---|
| 3,734,245 A | * | 5/1973 | Hubbard | 188/163 |
| 3,763,968 A | * | 10/1973 | Noly | 188/171 |
| 4,049,089 A | * | 9/1977 | Rundle | 188/171 |
| 4,381,048 A | * | 4/1983 | Haverkamp et al. | 188/171 |
| 4,633,110 A | * | 12/1986 | Genco et al. | 310/71 |
| 4,673,834 A | * | 6/1987 | Wrobel | 310/71 |
| 4,921,078 A | * | 5/1990 | Sommer | 188/171 |
| 5,150,420 A | * | 9/1992 | Haraguchi | 382/119 |
| 5,306,989 A | * | 4/1994 | Feller, Jr. | 318/372 |
| 5,490,583 A | * | 2/1996 | Anderson et al. | 188/61 |
| 5,717,174 A | * | 2/1998 | Ramos | 187/288 |
| 5,933,067 A | * | 8/1999 | Frolov | 335/251 |

FOREIGN PATENT DOCUMENTS

| | | | |
|---|---|---|---|
| EP | 0 423 361 | * | 4/1991 |
| GB | 2 044 867 A | | 10/1980 |
| WO | WO 90 13168 A | | 11/1990 |
| WO | WO 95 15876 A | | 6/1995 |

\* cited by examiner

Primary Examiner—Joseph Waks
(74) Attorney, Agent, or Firm—Marshall, Gerstein & Borun

(57) ABSTRACT

An electromagnetically actuated mechanical brake 12 for an electric motor, for a geared motor, with an excitation coil 5 for the electromagnetic actuation of the brake 12, in particular for releasing the brake 12, and with a circuit arrangement 9 to supply an excitation current to the excitation coil 5, in which the excitation coil 5 and the circuit arrangement 9 are together integrated into a structural unit 13.

15 Claims, 2 Drawing Sheets

ELECTROMAGNETIC OPERABLE MECHANICAL BRAKE FOR AN ELECTRIC MOTOR

BACKGROUND OF THE INVENTION

The invention relates to an electromagnetically actuated mechanical brake for an electric motor, in particular for a geared motor.

Electric machines, in particular electric motors, can be very well controlled with respect to their rotational speed. One known means of improving this basic controllability is to provide mechanical brakes, which can be released or raised by means of an electromagnetic apparatus. While the electric motor is in operation, the current powering the electric motor is also supplied to an excitation coil of the electromagnetically actuated mechanical brake, so that the brake is released and remains released. When no current is thus supplied, the electric motor is immobilized by application of a spring force with a braking action.

Furthermore, a known means of powering electric motors is by an alternating-current or polyphasic mains supply. In this case, if the motor incorporates an excitation coil operated by direct current, converters or rectifiers are employed. Because the operating voltages of a.c. or polyphasic mains vary in different parts of the world, excitation coils are manufactured and sold in a great variety of types. For each type, in turn, there are one or several types of rectifiers that can be combined with the excitation coil.

During the installation of an electromagnetically actuated mechanical brake, mistakes are often made in that a rectifier is wrongly combined with an excitation coil and with other components of the brake. The consequences are malfunction and defects of the excitation coil and/or the rectifier. Furthermore, often when such defects are noted either only the excitation coil or only the rectifier is replaced. The possibility is sometimes overlooked that because of the defect in one component, the other may also have become nonfunctional. Just as when the brake is newly installed, it can happen that during maintenance a defective rectifier or excitation coil is accidentally replaced by one of a different type. For this reason, too, the replacement part and/or the part that has not been replaced may become nonfunctional immediately after installation.

In addition to a rectifier, other circuit components may be provided by means of which an excitation current is sent to the excitation coil. In particular when an excitation coil driven by an a.c. or polyphasic mains supply is used, it is possible to operate without a rectifier. Even in this case, however, circuit components are customarily used to conduct, and in particular to control, an excitation current to the excitation coil. In this case, too, care must be taken to ensure a correct combination of the circuitry that supplies the excitation current with the excitation coil and with other components of the brake.

The object of the invention is to develop an electromagnetically actuated mechanical brake for an electric motor, in particular for a geared motor, in such a way as to make installation as easy as possible and to ensure that it is correct with respect to the combination of components. In addition, the storage of components for the brake is to be made simple and such that it is easy to keep track of the stock.

SUMMARY OF THE INVENTION

In the electromagnetically actuated mechanical brake for an electric motor in accordance with the invention, an excitation coil is provided for the electromagnetic actuation of the brake. In addition, a circuit arrangement is provided to supply an excitation current to the excitation coil. The excitation coil and the circuit arrangement are integrated with one another in a structural unit. Other components are also preferably integrated into the structural unit, such as pressure springs to produce a braking force. Because of this integrated design, incorrect combinations of components are nearly impossible. For example, the external shape of the structural unit can be made such that it can be combined with additional components of the brake in only one way, namely with components that are suitable. The additional components in question here are in particular the disks of a disk brake, in provided with friction surfaces and actuated by the excitation coil. The invention considerably simplifies storage, because now instead of at least two components, namely the excitation coil and the circuit arrangement, only a single structural unit needs to be kept in stock. As a result, there is no further need for elaborate lists from which to determine the right combination of components. Furthermore, both new installation and the installation of replacement parts are simplified. For this reason the time the mechanic must spend on installation can be considerably shortened. The components can be assembled in advance, for example automatically on an assembly line.

Preferably the structural unit comprises a one-piece carrier on which both the excitation coil and the circuit arrangement are disposed. The carrier is preferably so constructed that after the structural unit has been completed, the components cannot be detached from the carrier, or are detachable only with great effort or special tools. A one-piece carrier simplifies the construction and hence the manufacture of the structural unit. Because the components are not detachable or are more difficult to detach from the carrier, an incorrect combination of components is practically ruled out.

In a further development, the carrier comprises a housing that preferably consists of metal, in particular gray cast iron or diecast aluminium. These materials guarantee good thermal conductance, so that local overheating can be avoided. This is advantageous particularly when, during prolonged operation of an electric motor, the excitation coil produces heat that must be dissipated. In any case, however, a housing made in one piece can be so designed as to ensure a uniform temperature distribution and good heat transfer to surrounding components or the ambient air.

In another modification the carrier is made of plastic. With a plastic carrier, weight and material costs can be saved.

To avoid overheating of the circuit arrangement, which in particular comprises temperature-sensitive semiconductor components, the structural unit is preferably so constructed that the heat-conduction resistance between the circuit arrangement and the excitation coil is both considerably larger than the heat-conduction resistance between the circuit arrangement and the carrier and also considerably larger than the heat-conduction resistance between the excitation coil and the carrier. In this case both the excitation coil and the circuit arrangement can release heat into the carrier. In a further development the circuit arrangement can additionally transmit heat to the surroundings or other components of the brake by other means; that is, additional heat-conduction resistances, of the smallest possible dimensions, are present in association with the circuit arrangement. In particular, the movement of the electric motor is also utilized to drive forced convection by means of which the circuit arrangement and/or the excitation coil are cooled.

In particular to simplify the manufacture of an electromagnetically actuated mechanical brake in accordance with the invention, the excitation coil and the circuit arrangement are potted in a block of plastic and/or coated with plastic by spraying.

In a further development of the brake in accordance with the invention, the connector by way of which the circuit arrangement is connected to a current source, in particular an a.c. mains supply, is so constructed that a low heat-conduction resistance can be produced between the circuit arrangement and a mains lead. The mains lead in a variant of this embodiment is fixedly joined to the circuit arrangement. In particular, in order to produce the low heat-conduction resistance the connector comprises a thermal contact surface that is larger than a cross-sectional area of the circuit arrangement, the circuit arrangement being disposed along the thermal contact surface at only a small distance therefrom. Thus the mains lead can account for a considerable proportion of the heat conduction away from the circuit arrangement.

In yet another further development, the heat-conduction resistance between the circuit arrangement and the excitation coil is considerably greater than the heat-conduction resistance between the excitation coil and the surroundings of the structural unit. Therefore, under normal operating conditions, overheating of the circuit arrangement can be avoided.

Preferably the circuit arrangement is connected to a cooling plate, preferably made of aluminium, to conduct heat away. In particular, the circuit arrangement extends substantially two-dimensionally along the cooling plate. In this embodiment the cooling plate also ensures that the heat that needs to be dissipated from the power components of the circuit arrangement is distributed or transported away.

It is useful for a thermal barrier to be positioned between the excitation coil and the circuit arrangement. In one embodiment the thermal barrier consists of a material with low heat conductance, in particular a ceramic material. In another embodiment the material connecting the excitation coil to the circuit arrangement is so formed as to amount to a thermal barrier on account of its dimensions. In particular, this connecting material has the shape of a bridge. If this material bridge is suitably constructed, it alone can ensure a high heat-conduction resistance between the excitation coil and the circuit arrangement. In many applications of the brake in accordance with the invention, no means of thermal decoupling other than such a bridge are needed.

BRIEF DESCRIPTION OF THE DRAWINGS

In the following the invention is explained by description of exemplary embodiments. However, the invention is not limited to these exemplary embodiments. Their description is assisted by the attached drawings, wherein.

DETAILED DESCRIPTION

Figure 1:
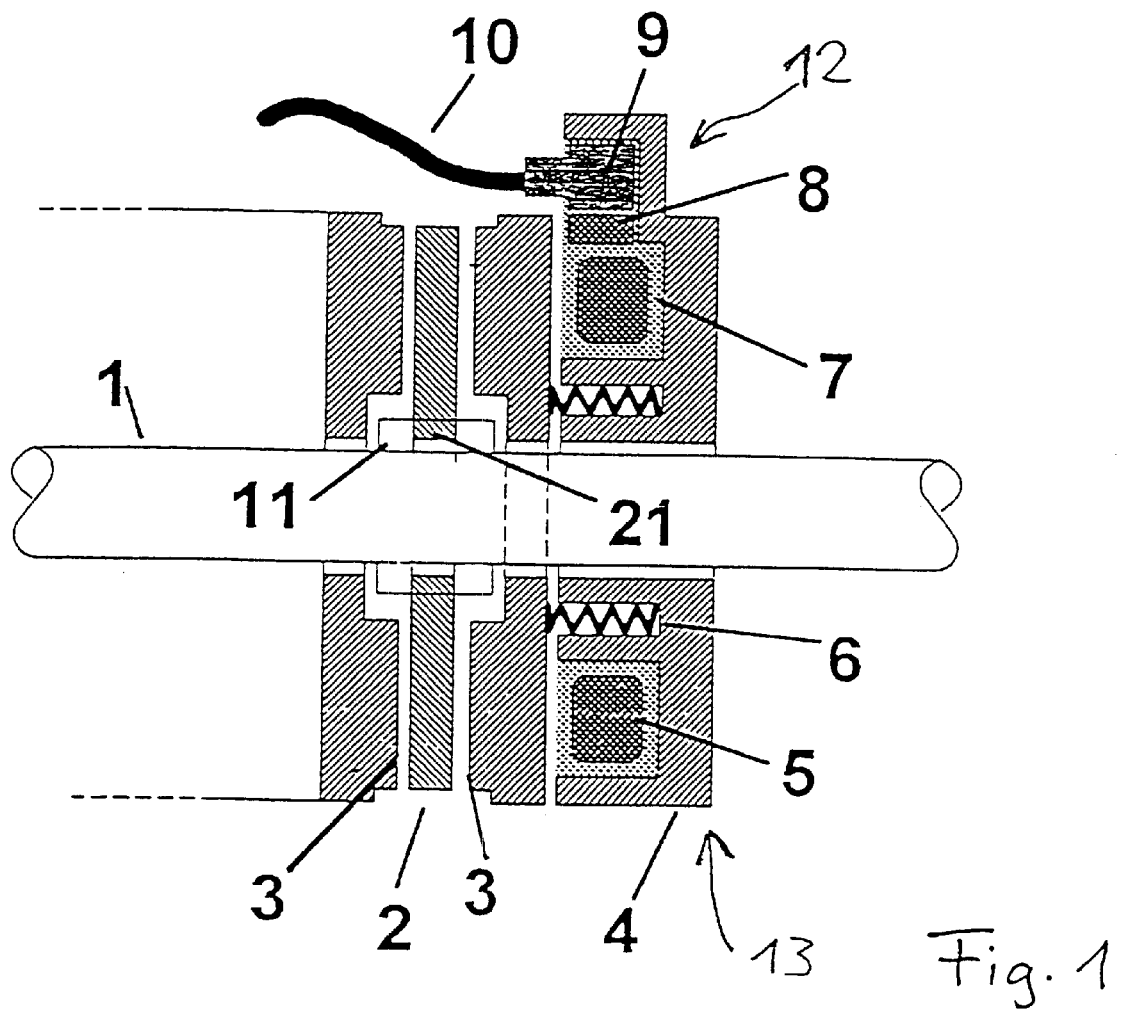
FIG. 1 shows a first exemplary embodiment of the brake in accordance with the invention and FIG. 2 shows a second exemplary embodiment.

In the left part of FIG. 1 is the winding of an electric motor, which comprises a motor shaft 1 that can rotate within the motor housing. By an of axial interlocking arrangement 11, 21 a lining-covered disk 2 is attached to the motor shaft 1 in a torsionally fixed manner. All the other parts shown in FIG. 1 are at rest while the motor is in operation. In this drawing, on the right and on the left of the lining-covered disk 2 in order to brake the motor. Pressure against the frictional surfaces 3 also serves to prevent unintended rotation of the motor shaft 1. During operation of the motor, in contrast, there flows through the excitation coil 5 an excitation current that raises the brake 12 and thus removes the frictional surfaces 3 from the lining-covered disk 2. In the embodiment shown here the mechanism is a disk brake with a d.c. excitation coil, which however is driven by an a.c. mains supply or by one of a three-phase supply. For this reason a circuit arrangement such as a brake rectifier 9 is provided, which rectifies the alternating current. The brake rectifier 9 is connected to the a.c. or three-phase mains by a mains lead 10.

In accordance with the invention the excitation coil 5 and the brake rectifier 9 are together integrated into a structural unit 13. The structural unit 13 comprises a carrier or housing 4, preferably a one-piece carrier made of diecast aluminum, which carries both the excitation coil 5 and the brake rectifier 9.

So that they can be embedded in the housing 4, the excitation coil 5 and the brake rectifier 9 are coated in a mass of plastic 7, the thickness of which is exaggerated in FIG. 1. In actuality the layer of plastic 7 between the excitation coil 5 and the housing 4, like that between the brake rectifier 9 and the housing 4, is only a few tenths of a millimeter thick. For this reason, the heat-conduction resistance $R_{54}$ between the excitation coil 5 and the housing 4 is small, as is the heat-conduction resistance $R_{94}$ between the brake rectifier 9 and the housing 4.

Between the brake rectifier 9 and the excitation coil 5 is disposed a thermal barrier 8 made of poorly heat-conducting material, in particular ceramic material. The heat-conduction resistance $R_{95}$ between the brake rectifier 9 and the excitation coil 5 is therefore considerably larger than the heat-conduction resistances $R_{54}, R_{95}$.

During operation of the brake 12—that is, when an excitation current is flowing through the excitation coil 5—heat is produced by processes including ohmic losses. In comparison, the heat production by the brake rectifier 9 is relatively slight. For this reason, the temperature of the excitation coil 5 becomes distinctly higher than that of its surroundings. Because components of the brake rectifier 9 are temperature-sensitive, the structural features described above and others are provided in order to prevent the brake rectifier 9 from reaching a temperature that would endanger its components. One effect of these measures is that the heat produced in the excitation coil 5 is substantially completely transferred to the surroundings of the brake 12; another is that the small amount of heat produced by the excitation coil 5 that reaches the brake rectifier 9 is also then transmitted to the surroundings. Furthermore, heat generated within the brake rectifier 9 is likewise dissipated into the surroundings. In the exemplary embodiment shown here heat dissipation occurs even apart from the nature of the heat-conduction resistances $R_{54}$, $R_{94}$, $R_{95}$ just described, because the structural unit 13 is disposed in the stream of cooling air from the electric motor. As yet another independent process, the mains lead 10 contributes to the removal of heat from the brake rectifier 9.

Figure 2:
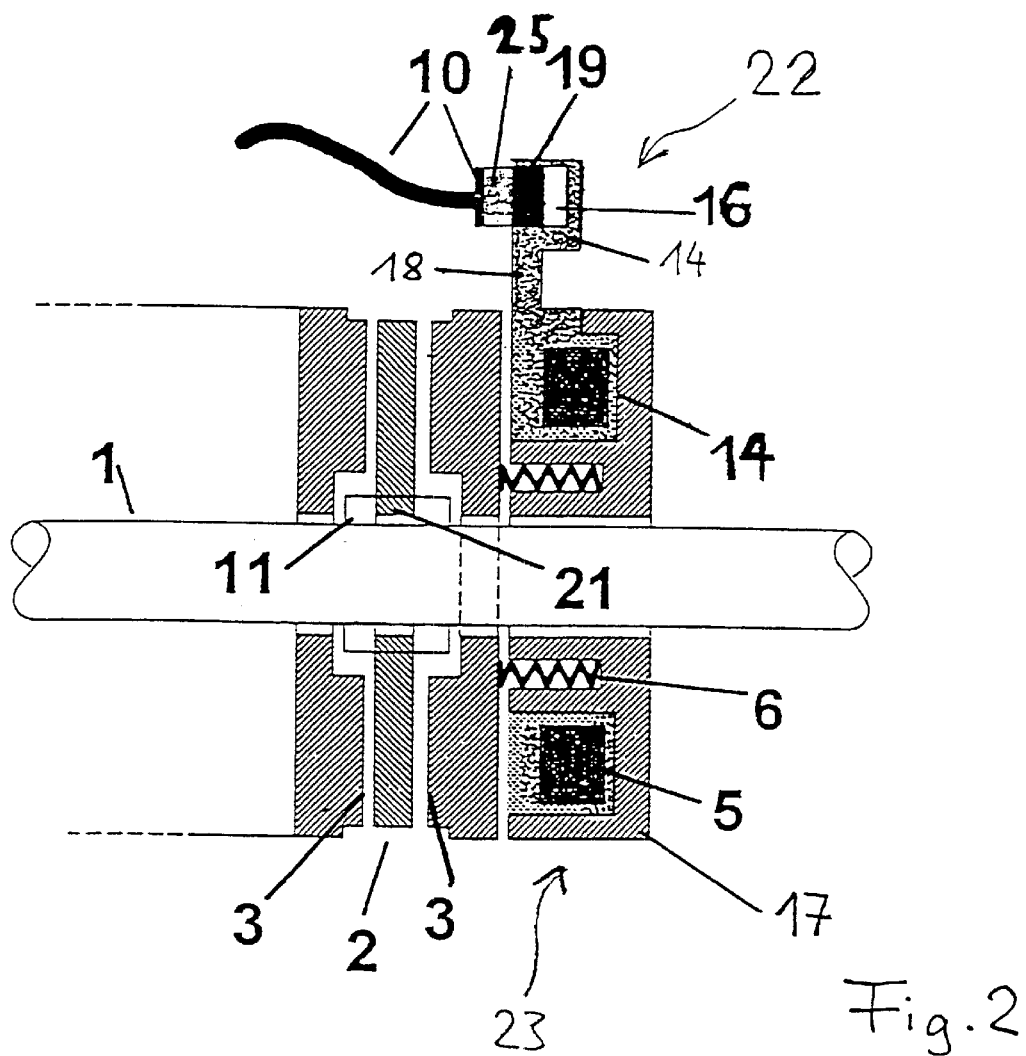

The embodiment shown in FIG. 2 differs from that of FIG. 1 in the construction of the structural unit 23. Instead of a simple brake rectifier, the brake 22 comprises a circuit arrangement expanded to include control elements. This control circuit 19 contains particularly temperature-sensitive components. For this reason, measures beyond those in the embodiment of FIG. 1 have been taken to protect against overheating. One is that the structural unit 23 comprises a cooling plate 16, disposed directly adjacent to the control circuit 19 and preferably made of aluminium. The cooling plate 16 ensures a uniform temperature distribution over the extent of the control circuit 19 and an effective transport of heat away from the control circuit 19.

Because heat transfer from solid materials to ambient air is generally poor, on the other side of the control circuit 19 a plug-in connector 25 is provided that is so constructed as to transmit heat well into the mains lead 10. For this purpose the plug-in connector 25 comprises a large thermal contact surface, larger than the cross-sectional area of the control circuit 19 disposed along the plug-in connector 25.

Likewise in distinction to the embodiment described previously, the structural unit 23 comprises a plastic carrier 14 that carries the excitation coil 5 and the control circuit 19. The plastic carrier 14 is preferably produced by casting and is one-piece as shown in FIG. 2. The first step is to join the excitation coil 5, the cooling plate 16 and the plug-in connector 25 to one another. Because of the temperature sensitivity of its components, the control circuit 10 is incorporated later.

To provide thermal isolation of the control circuit 19 from the excitation coil 5, the plastic carrier 14 comprises a plastic bridge 18 of relatively thin material. In the region of the excitation coil 5 the unit is enclosed in a casing 17 made, for example, also of plastic or of metal. When it is necessary to exchange the excitation coil 5 and/or the control circuit 19, either the entire structural unit 23 including the casing 17 is replaced or only the plastic carrier 14 together with the components it carries. In the latter case, by making the external contours of the casing a different shape for different types of brakes it can be guaranteed that only a plastic carrier with a complementary shape, which fits into the casing and carries the correct types of excitation coil and control circuit, will be used.

In further embodiments of the invention, not shown here, characteristics of the two exemplary embodiments can be combined with one another. For example, a brake rectifier according to FIG. 1 can be provided instead of a control circuit in the arrangement of FIG. 2.

The invention achieves a reduction of the number of components that need to be stored and marketed worldwide for the installation of electromagnetically operable mechanical brakes. Furthermore, integration of the excitation coil and the circuit arrangement to supply the excitation current into a single structural unit avoids the possibility of incorrectly combining components. As a result, rapid and reliable installation and repair are ensured.

What is claimed is:

1. An electromagnetically actuated mechanical brake for an electric motor comprising:
    an excitation coil for electromagnetic actuation of the brake where the electromagnetic actuation is at least used to release the brake;
    a circuit arrangement configured to supply an excitation current to the excitation coil, the circuit arrangement comprising at least one of a rectifier and a control circuit; and
    a structural unit comprising a one-piece carrier configured to integrally house and carry the excitation coil and the circuit arrangement.

2. A brake according to claim 1, wherein the carrier is comprised of a housing comprised of a metal that is comprised of at least one of gray cast iron and diecast aluminum.

3. A brake according to claim 1, wherein the carrier is made of plastic.

4. A brake according to claim 1, wherein the brake is configured such that a first heat-conduction resistance between the circuit arrangement and the excitation coil is considerably larger than a second heat-conduction resistance between the circuit arrangement and the carrier and also considerably larger than a third heat-conduction resistance between the excitation coil and the carrier.

5. A brake according to claim 1, wherein the excitation coil and the circuit arrangement are at least one of potted in a block of plastic and coated in plastic by spraying.

6. An electromagnetically actuated mechanical brake for an electric motor comprising:
    an excitation coil for electromagnetic actuation of the brake where the electromagnetic actuation is at least used to release the brake;
    a circuit arrangement configured to supply an excitation current to the excitation coil, the circuit arrangement comprising at least one of a rectifier and a control circuit, wherein the excitation coil and the circuit arrangement are integrated together into a structural unit; and
    an electrical connector to connect the circuit arrangement to a current source, in particular an a.c. mains supply, wherein the connector is so constructed as to produce a low heat-conduction resistance between the circuit arrangement and a mains lead.

7. A brake according to claim 6, wherein the connector comprises a thermal contact surface to produce the low heat-conduction resistance, which is larger than a cross-sectional area of the circuit arrangement, the circuit arrangement being disposed along and only slightly separated from the thermal contact surface.

8. An electromagnetically actuated mechanical brake for an electric motor comprising:
    an excitation coil for electromagnetic actuation of the brake where the electromagnetic actuation is at least used to release the brake;
    a circuit arrangement configured to supply an excitation current to the excitation coil, the circuit arrangement comprising at least one of a rectifier and a control circuit; wherein the excitation coil and the circuit arrangement are integrated together into a structural unit; and
    wherein the brake is configured such that a first heat-conduction resistance between the circuit arrangement and the excitation coil is considerably greater than a second heat-conduction resistance between the excitation coil and the surroundings of the structural unit.

9. An electromagnetically actuated mechanical brake for an electric motor comprising:
    an excitation coil for electromagnetic actuation of the brake where the electromagnetic actuation is at least used to release the brake;
    a circuit arrangement configured to supply an excitation current to the excitation coil, the circuit arrangement comprising at least one of a rectifier and a control circuit; wherein the excitation coil and the circuit arrangement are integrated together into a structural unit; and
    wherein the circuit arrangement is connected to a cooling plate to conduct heat away.

10. A brake according to claim 9, wherein the cooling plate is comprised of aluminum.

11. An electromagnetically actuated mechanical brake for an electric motor comprising:
    an excitation coil for electromagnetic actuation of the brake where the electromagnetic actuation is at least used to release the brake;

a circuit arrangement configured to supply an excitation current to the excitation coil, the circuit arrangement comprising at least one of a rectifier and a control circuit; wherein the excitation coil and the circuit arrangement are integrated together into a structural unit; and a thermal barrier disposed between the excitation coil and the circuit arrangement.

12. A brake according to claim 11, wherein the thermal barrier is made of a material with low thermal conductance.

13. A brake according to claim 12, wherein the material is comprised of a ceramic material.

14. A brake according to claim 11, wherein a material connection between the excitation coil and the circuit arrangement is so constructed that the material connection serves as a thermal barrier due to the dimensions of the material connection.

15. A brake according to claim 14, wherein the material connection is bridge-like.

* * * * *